United States Patent
Kim et al.

(10) Patent No.: US 11,618,679 B2
(45) Date of Patent: Apr. 4, 2023

(54) ENTANGLED-TYPE CARBON NANOTUBES AND METHOD FOR PREPARING THE SAME

(71) Applicant: LG CHEM, LTD., Seoul (KR)

(72) Inventors: Sung Jin Kim, Daejeon (KR); Dong Hyun Cho, Daejeon (KR); Jae Keun Yoon, Daejeon (KR); Tae Hyung Kim, Daejeon (KR); Og Sin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 470 days.

(21) Appl. No.: 16/628,555

(22) PCT Filed: Nov. 27, 2018

(86) PCT No.: PCT/KR2018/014738
§ 371 (c)(1),
(2) Date: Jan. 3, 2020

(87) PCT Pub. No.: WO2019/132265
PCT Pub. Date: Jul. 4, 2019

(65) Prior Publication Data
US 2020/0239315 A1 Jul. 30, 2020

(30) Foreign Application Priority Data

Dec. 26, 2017 (KR) .................. 10-2017-0179768
Nov. 26, 2018 (KR) .................. 10-2018-0146925

(51) Int. Cl.
*C01B 32/158* (2017.01)
*C01B 32/162* (2017.01)
(Continued)

(52) U.S. Cl.
CPC .............. *C01B 32/162* (2017.08); *B01J 21/04* (2013.01); *B01J 23/8472* (2013.01);
(Continued)

(58) Field of Classification Search
CPC . C01B 32/158; C01P 2006/10; C01P 2006/11
See application file for complete search history.

(56) References Cited

U.S. PATENT DOCUMENTS 9,399,578 B2   7/2016   Kang et al.
9,956,546 B2   5/2018   Kim et al.
(Continued)

FOREIGN PATENT DOCUMENTS

CN   102002652 B   6/2012
CN   104884384 A   9/2015
(Continued)

OTHER PUBLICATIONS

Office Action of Taiwanese Patent Office in Appl'n No. 11021127730, dated Nov. 17, 2021.

*Primary Examiner* — Hoa (Holly) Le
(74) *Attorney, Agent, or Firm* — Dentons US LLP (57) ABSTRACT

The present invention relates to entangled-type carbon nanotubes which have a bulk density of 31 kg/m³ to 85 kg/m³ and a ratio of tapped bulk density to bulk density of 1.37 to 2.05, and a method for preparing the entangled-type carbon nanotubes.

7 Claims, 4 Drawing Sheets

(51) Int. Cl.
- *B01J 21/04* (2006.01)
- *B01J 23/847* (2006.01)
- *B01J 37/02* (2006.01)
- *B01J 37/04* (2006.01)
- *B01J 37/08* (2006.01)
- B82Y 30/00 (2011.01)
- B82Y 40/00 (2011.01)

(52) U.S. Cl.
CPC ........... *B01J 37/0219* (2013.01); *B01J 37/04* (2013.01); *B01J 37/088* (2013.01); *B82Y 30/00* (2013.01); *B82Y 40/00* (2013.01); *C01B 2202/22* (2013.01); *C01B 2202/36* (2013.01); *C01P 2002/78* (2013.01); *C01P 2004/03* (2013.01); *C01P 2006/11* (2013.01)

(56) References Cited

U.S. PATENT DOCUMENTS

| | | |
|---|---|---|
| 2004/0036060 A1 | 2/2004 | Morita et al. |
| 2012/0149824 A1 | 6/2012 | Hocke et al. |
| 2014/0255698 A1 | 9/2014 | Kang et al. |
| 2015/0273441 A1 | 10/2015 | Kim et al. |
| 2015/0274529 A1* | 10/2015 | Kim ....................... B01J 21/185 427/249.1 |
| 2015/0298974 A1 | 10/2015 | Kim et al. |
| 2016/0214863 A1 | 7/2016 | Kim et al. |
| 2018/0162734 A1 | 6/2018 | Kang et al. |
| 2018/0175439 A1 | 6/2018 | Kang et al. |
| 2018/0269485 A1 | 9/2018 | Yoo et al. |
| 2019/0263662 A1* | 8/2019 | Kim ......................... H01B 1/04 |

FOREIGN PATENT DOCUMENTS

| | | |
|---|---|---|
| CN | 105517707 A | 4/2016 |
| EP | 2746221 A1 | 6/2014 |
| EP | 3053877 A1 | 8/2016 |
| JP | 2002-237303 A | 8/2002 |
| JP | 2002-266170 A | 9/2002 |
| JP | 2011047081 A | 3/2011 |
| JP | 2016-25077 A | 2/2016 |
| JP | 5898618 B2 | 4/2016 |
| JP | 2018-513083 A | 5/2018 |
| KR | 10-20150027675 A | 3/2015 |
| KR | 10-20150037661 A | 4/2015 |
| KR | 10-20150142408 A | 12/2015 |
| KR | 10-20170011834 A | 2/2017 |
| KR | 10-20170031061 A | 3/2017 |
| KR | 10-20170037454 A | 4/2017 |
| KR | 10-20170037458 A | 4/2017 |
| WO | 2015-047048 A1 | 4/2015 |
| WO | 2016/171386 A1 | 10/2016 |
| WO | 2017052064 A1 | 3/2017 |

* cited by examiner

ENTANGLED-TYPE CARBON NANOTUBES AND METHOD FOR PREPARING THE SAME

The present application is a National Phase entry pursuant to 35 U.S.C. § 371 of International Application No. PCT/KR2018/014738 filed on Nov. 27, 2018, and claims priority to and the benefit of Korean Patent Application Nos. 10-2017-0179768 filed on Dec. 26, 2017 and 10-2018-0146925 filed on Nov. 26, 2018, the disclosures of which are incorporated herein by reference in their entirety.

FIELD

The present invention relates to entangled-type carbon nanotubes and a method for preparing the entangled-type carbon nanotubes, and more particularly, to entangled-type carbon nanotubes exhibiting enhanced dispersibility and conductivity by adjusting a ratio of tapped bulk density to bulk density, and a method for preparing the entangled-type carbon nanotubes.

BACKGROUND

Carbon nanotubes, which are a type of fine carbon fibers, are a tubular form of carbon having an average diameter of 1 μm or less, and are expected to be applied to various fields due to their high conductivity, tensile strength, and heat resistance derived from their unique structures. However, despite the availability of such carbon nanotubes, carbon nanotubes have limitations in usage due to their low solubility and dispersibility. Thus, a conductive material dispersion prepared by pre-dispersing carbon nanotubes in a dispersion medium has been used. However, carbon nanotubes are unable to form a stably dispersed state in a dispersion medium and are agglomerated with each other due to strong Van der Waals interactions.

To address these problems, various attempts have been made. Specifically, methods of dispersing carbon nanotubes in a dispersion medium through mechanical dispersion treatment such as ultrasonic treatment, or the like have been proposed. However, when these methods are used, excellent dispersibility is obtained during irradiation of ultrasonic waves, but carbon nanotubes start to agglomerate with each other when ultrasonic irradiation is completed. In addition, methods of stably dispersing carbon nanotubes using a variety of dispersants have been proposed. However, these methods also have a problem such as difficulty in handling due to an increase in viscosity when carbon nanotubes are dispersed in a dispersion medium at a high concentration.

Therefore, there is a need to develop carbon nanotubes with enhanced dispersibility without a reduction in conductivity.

SUMMARY

An object of the present invention is to provide entangled-type carbon nanotubes having excellent dispersibility and excellent conductivity, and a method for preparing the carbon nanotubes.

To address the above-described technical problem, the present invention provides entangled-type carbon nanotubes which have a bulk density of 31 kg/m³ to 85 kg/m³ and satisfy the following Equation 1:

$$1.37 \leq X/Y \leq 2.05 \quad \text{<Equation 1>}$$

wherein, in Equation 1, X denotes a tapped bulk density (units: kg/m³) of the entangled-type carbon nanotubes, and Y denotes a bulk density (units: kg/m³) of the entangled-type carbon nanotubes.

The present invention also provides a method for preparing entangled-type carbon nanotubes, comprising: mixing an organic acid and a vanadium precursor in a molar ratio of 1:0.0463 to 1:0.0875 to prepare a mixture; mixing the mixture and a cobalt precursor to prepare a catalyst precursor; performing first heat treatment on aluminum hydroxide to prepare a support; supporting the catalyst precursor on the support and performing second heat treatment on the resulting support to prepare a supported catalyst; and reacting the supported catalyst with a carbon-based compound.

Entangled-type carbon nanotubes according to the present invention have excellent conductivity and excellent dispersibility, and thus can be included in a carbon nanotube dispersion at a high concentration.

DETAILED DESCRIPTION

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain his/her invention in the best way.

In the present invention, carbon nanotubes refer to pristine carbon nanotubes that have not undergone separate processing.

In the present invention, entangled-type carbon nanotubes refer to a secondary structural form in which a plurality of carbon nanotube units are entangled with each other without a certain form such as a bundle or a rope.

In the present invention, bundle-type carbon nanotubes refer to the arrangement of a plurality of carbon nanotube units such that longitudinal axes of the units are parallel to each other in substantially the same orientation, or a secondary structural form twisted or entangled into a bundle or rope form after the arrangement.

In the present invention, the carbon nanotube unit has a graphite sheet in the form of a cylinder having a nano-sized diameter, and has a sp² bonding structure. In this case, the graphite sheet may exhibit characteristics of a conductor or a semiconductor according to the wound angle and structure. The carbon nanotube units may be classified into single-walled carbon nanotubes (SWCNTs), double-walled carbon nanotubes (DWCNTs), and multi-walled carbon nanotubes (MWCNTs) according to the number of bonds forming the walls, and the thinner the walls, the lower the resistance.

In the present invention, the bulk density of carbon nanotubes may be measured in accordance with ASTM B329, particularly ASTM B329-06. In addition, the bulk density may be measured using a Scott volumeter (Version USP 616).

In the present invention, the bulk density of the carbon nanotubes may be measured in accordance with laboratory conditions, and substantially the same results as those based on the above-described rule may be obtained.

For the measurement of bulk density in a laboratory, a 5 ml cylinder (manufacturer: DURAN, material: glass) is placed on a scale, the scale is calibrated to 0.5 ml of carbon nanotubes are added to the cylinder, the volume of the carbon nanotubes is measured by reading the scale after adjusting the eye level to the height of the carbon nanotubes, the carbon nanotubes are weighed, and then the bulk density may be calculated using the following Equation:

Bulk density (kg/m$^3$)=weight (kg) of carbon nanotubes/volume (m$^3$) of carbon nanotubes In the present invention, the tapped bulk density (TD) of carbon nanotubes may be measured in accordance with ASTM B527-06, particularly using TAP-2S available from LOGAN.

In the present invention, the tapped bulk density of carbon nanotubes may be measured in accordance with laboratory conditions, and even in the case of measurement in accordance with laboratory scales, substantially the same results as those based on the rule may be obtained.

For measurement of the tapped bulk density in a laboratory, a 5 ml cylinder (manufacturer: DURAN, material: glass) is placed on a scale, the scale is calibrated to 0, carbon nanotubes are added to the cylinder, the volume of the carbon nanotubes is measured by reading the scale after adjusting the eye level to the height of the carbon nanotubes, and then the carbon nanotubes are weighed. After tapping the cylinder lightly about 100 times on the floor, the volume of the carbon nanotubes is measured by reading the gradation of the cylinder, and the tapped bulk density may be calculated by the following Equation:

Tapped bulk density (kg/m$^3$)=(weight (kg) of carbon nanotubes/volume (m$^3$) of carbon nanotubes after tapping 100 times)

In the present invention, the specific surface area of carbon nanotubes may be measured by a BET method, and may be calculated from the amount of nitrogen gas adsorbed at a liquid nitrogen temperature (77° K) using, for example, BELSORP-mini II manufactured by BEL Japan.

In the present invention, the average diameter and length of the carbon nanotube units may be measured using a field emission scanning electron microscope.

1. Entangled-Type Carbon Nanotubes

Entangled-type carbon nanotubes according to an embodiment of the present invention have a bulk density of 31 kg/m$^3$ to 85 kg/m$^3$ and satisfy the following Equation 1:

$$1.37 \leq X/Y \leq 2.05 \qquad \text{<Equation 1>}$$

wherein, in Equation 1, X denotes a tapped bulk density (units: kg/m$^3$) of the entangled-type carbon nanotubes, and Y denotes a bulk density (units: kg/m$^3$) of the entangled-type carbon nanotubes.

When the bulk density of the entangled-type carbon nanotubes is less than the above-described range, the characteristics of the entangled-type carbon nanotubes are unable to be realized, and thus carbon nanotubes cannot be dispersed in a dispersion medium at a high concentration when a carbon nanotube dispersion is prepared. When the bulk density of the entangled-type carbon nanotubes exceeds the above-described range, a space between carbon nanotube units constituting the entangled-type carbon nanotubes is so compact that the carbon nanotubes are not easily untangled in a solvent. Thus, in a process of dispersing the entangled-type carbon nanotubes, the carbon nanotube units are more likely to be broken and consequently, conductivity may be reduced.

The entangled-type carbon nanotubes may have a bulk density of preferably 32 kg/m$^3$ to 80 kg/m$^3$, more preferably 32 kg/m$^3$ to 68 kg/m$^3$. When the bulk density of the entangled-type carbon nanotubes is within the above range, the carbon nanotubes may have sufficient particle properties, and thus the carbon nanotubes may be slowly dispersed at a high concentration in a carbon nanotube dispersion preparation process.

Equation 1 is an index showing the morphology of the entangled-type carbon nanotubes, and a value of Equation 1 is 1.37 to 2.05, preferably 1.4 to 2.0, and more preferably 1.49 to 2.0. When the value of Equation 1 is less than the above-described range, this means entangled-type carbon nanotubes in which carbon nanotube units are very densely entangled with each other, and thus it is difficult for the carbon nanotube units to be easily dispersed when a carbon nanotube dispersion is prepared. When the value of Equation 1 exceeds the above-described range, this means a wide interval between carbon nanotube units due to interactions therebetween, and thus it is difficult for the carbon nanotube units to be dispersed at a high concentration when a carbon nanotube dispersion is prepared.

The entangled-type carbon nanotubes, which have a bulk density within the above-described range and satisfy the condition of Equation 1, may have sufficient particle properties like existing entangled-type carbon nanotubes and have a loose structure between carbon nanotube units like bundle-type carbon nanotubes. That is, the entangled-type carbon nanotubes may be of an entangled type, but may also have some characteristics of bundle-type carbon nanotubes. Accordingly, the entangled-type carbon nanotubes may be slowly dispersed and thus dispersed at a high concentration in a carbon nanotube dispersion preparation process. In addition, since an interval between the carbon nanotube units is not compact, the carbon nanotube units may be more easily untangled than existing entangled-type carbon nanotube units, when dispersed in a dispersion medium. Thus, breakage of the carbon nanotube units may be reduced in the dispersion process, and consequently, relatively long carbon nanotube units are present in a dispersion medium. Accordingly, the carbon nanotube dispersion may exhibit further enhanced conductivity.

The entangled-type carbon nanotubes may have a tapped bulk density of preferably 63 kg/m$^3$ to 116 kg/m$^3$, more preferably 65 kg/m$^3$ to 102 kg/m$^3$. When the tapped bulk density of the entangled-type carbon nanotubes is within the above-described range, the carbon nanotube units may be easily untangled in a dispersion medium due to a less compact interval between the carbon nanotube units than that of existing entangled-type carbon nanotube units, and thus the breakage of the carbon nanotube units may be reduced in the dispersion process, and consequently, relatively long carbon nanotube units may be present in a dispersion medium. Accordingly, the carbon nanotubes may exhibit further enhanced conductivity.

The entangled-type carbon nanotubes may have a BET specific surface area of 100 m$^2$/g to 300 m$^2$/g, preferably 150 m²/g to 280 m²/g, and more preferably 170 m²/g to 250 m²/g. When the BET specific surface area of the entangled-type carbon nanotubes is within the above-described range, the entangled-type carbon nanotubes have excellent powder resistivity and are suitable for use in high-concentration dispersions.

The entangled-type carbon nanotubes may have a powder resistance of 0.0171 Ω·cm or less and a maximum dispersion concentration of 3.3 wt % or more, preferably a powder resistance of 0.0170 Ω·cm or less and a maximum dispersion concentration of 3.4 wt % or more, and more preferably a powder resistance of 0.0168 Ω·cm or less and a maximum dispersion concentration of 3.5 wt % or more. When the powder resistance and maximum dispersion concentration of the entangled-type carbon nanotubes are within the above-described ranges, highly conductive entangled-type carbon nanotubes may be included in a carbon nanotube dispersion at a high concentration, and thus may be more suitable for used as a conductive material.

In this regard, the maximum dispersion concentration of the entangled-type carbon nanotubes may be a measured maximum amount of carbon nanotubes dispersible in a carbon nanotube dispersion prepared by adding the carbon nanotubes to N-methylpyrrolidone little by little. In addition, the powder resistance of the entangled-type carbon nanotubes may be calculated from surface current and voltage measured using 4 probes through Loresta-GX (Product Name, Manufacturer: MITSUBISHI CHEMICAL ANALYTECH) after filling an insulating mold with entangled-type carbon nanotubes so as to have a density of 1 g/cc and applying a pressure thereto.

The carbon nanotube units may have an average diameter of preferably 30 nm or less, more preferably 10 nm to 30 nm. When the average diameter of the carbon nanotube units is within the above-described range, dispersibility and conductivity may be enhanced.

The carbon nanotube units may have an average length of preferably 0.5 μm to 200 μm, more preferably 10 μm to 60 μm. When the average length of the carbon nanotube units is within the above-described range, carbon nanotube units exhibit excellent electrical conductivity and excellent strength, and are stable both at room temperature and a high temperature.

The carbon nanotube units may have an aspect ratio of preferably 5 to 50,000, more preferably 10 to 20,000, wherein the aspect ratio is defined as a ratio of the length (the length of a major axis passing through the center of the unit) of the carbon nanotube unit to the diameter (the length of a minor axis passing through the center of the unit and perpendicular to the major axis) of the carbon nanotube unit.

The average diameter and average length of the carbon nanotube units may be measured using a field emission scanning electrode microscope.

The carbon nanotube units have an interlayer distance ($d_{002}$) obtained by X-ray diffraction of a carbon crystal of 0.335 nm to 0.342 nm, may satisfy the following condition: interlayer distance ($d_{002}$)<0.3448-0.0028 (log φ) wherein φ is an average diameter of the carbon nanotube units, and may have a thickness (Lc) in a C-axis direction of the crystal of 40 nm or less.

The interlayer distance ($d_{002}$) may preferably be less than 0.3444-0.0028 (log φ), more preferably less than 0.3441-0.0028 (log φ).

When the interlayer distance ($d_{002}$) is within the above-described range, the carbon nanotube units may exhibit enhanced crystallinity, and entangled-type carbon nanotubes including the carbon nanotube units may exhibit further enhanced conductivity.

2. Method for Preparing Entangled-Type Carbon Nanotubes

Entangled-type carbon nanotubes according to an embodiment of the present invention are prepared using a method comprising: 1) mixing an organic acid and a vanadium precursor in a molar ratio of 1:0.0463 to 1:0.0875 to prepare a mixture; 2) mixing the mixture and a cobalt precursor to prepare a catalyst precursor; 3) performing first heat treatment on aluminum hydroxide to prepare a support; 4) supporting the catalyst precursor on the support and performing second heat treatment on the resulting support to prepare a supported catalyst; and 5) reacting the supported catalyst with a carbon-based compound.

Hereinafter, each process of the method for preparing entangled-type carbon nanotubes according to an embodiment of the present invention will be described in more detail.

1) Preparation of Mixture

First, an organic acid and a vanadium precursor are mixed in a molar ratio of 1:0.0463 to 1:0.0875 to prepare a mixture.

The organic acid and the vanadium precursor may be mixed in a molar ratio of preferably 1:0.047 to 1:0.086, more preferably 1:0.0475 to 1:0.077. When the mixing molar ratio is within the above-described range, entangled-type carbon nanotubes that are dispersible in a conductive material dispersion at a high concentration and have a low bulk density and a low tapped bulk density may be manufactured.

When the molar ratio of the organic acid to the vanadium precursor is less than the above-described range, a particle size distribution of catalyst particles decreases. When the molar ratio of the organic acid to the vanadium precursor exceeds the above-described range, bundle-type carbon nanotubes in addition to the entangled-type carbon nanotubes are manufactured.

The organic acid may be one or more selected from the group consisting of citric acid, tartaric acid, fumaric acid, malic acid, acetic acid, butyric acid, palmitic acid, and oxalic acid, and among these organic acids, citric acid is preferably used.

The vanadium precursor may be a salt of a vanadium compound, and preferably may be one or more selected from the group consisting of $NH_4VO_3$, $NaVO_3$, $V_2O_5$, and $V(C_5H_7O_2)_3$, and among them, $NH_4VO_3$ is more preferably used.

2) Preparation of Catalyst Precursor

Subsequently, the mixture is mixed with a cobalt precursor to prepare a catalyst precursor.

The mixture and the cobalt precursor may be mixed such that a molar ratio of vanadium and cobalt becomes 1:1 to 1:100, preferably 1:5 to 1:20. When the molar ratio is within the above-described range, yield is increased.

The cobalt precursor may be a salt of a cobalt compound, and preferably may be one or more selected from the group consisting of $Co(NO_3)_2.6H_2O$, $CoCl_2.6H_2O$, $Co_2(CO)_8$, and $[Co_2(CO)_6(t\text{-}BuC\equiv CH)]$, and among them, $Co(NO_3)_2.6H_2O$ is more preferably used.

The mixture and the cobalt precursor, i.e., the organic acid, the vanadium precursor, and the cobalt precursor, may be used in the form of a solution dissolved in a solvent, and the solvent may be one or more selected from the group consisting of water, methanol, and ethanol, and among them, water is preferably used.

The concentration of the citric acid, the vanadium precursor, and the cobalt precursor in the solution may range from 0.1 g/ml to 3 g/ml, preferably 0.5 g/ml to 2 g/ml, and more preferably 0.7 g/ml to 1.5 g/ml.

3) Preparation of Support

Subsequently, aluminum hydroxide $(Al(OH)_3)$ is subjected to first heat treatment to prepare a support.

The aluminum hydroxide may be pretreated before the first heat treatment.

The pretreatment process may be performed at a temperature of 50° C. to 150° C. for 1 hour to 24 hours. When the pretreatment process is performed, the residual solvent or impurities that may be present on a surface of the aluminum hydroxide may be removed.

The aluminum hydroxide may have an average particle diameter of 20 μm to 200 μm, a porosity of 0.1 cm$^3$/g to 1.0 cm$^3$/g, and a specific surface area of less than 1 m$^2$/g.

The first heat treatment process may be performed at a temperature of 250° C. to 500° C., preferably 400° C. to 500° C. In addition, the first heat treatment process may be performed in an air atmosphere.

Under the above-described conditions, a support including AlO(OH) and $Al(OH)_3$, which are obtained by conversion of aluminum hydroxide, in amounts of 30 wt % or more and 70 wt % or less, respectively, particularly 40 wt % or more and 60 wt % or less, respectively, and not including $Al_2O_3$ may be prepared.

The support may further include a metal oxide such as $ZrO_2$, MgO, $SiO_2$, or the like.

The shape of the support is not particularly limited, but the support may have a spherical shape or a potato shape. In addition, the support may have a porous structure, a molecular sieve structure, a honeycomb structure, or the like so as to have a relatively large surface area per unit mass or unit volume.

4) Preparation of Supported Catalyst

Subsequently, the catalyst precursor is supported on the support, and then subjected to second heat treatment, thereby preparing a supported catalyst.

The supporting process may be performed by uniformly mixing the support and the catalyst precursor, and then aging the resulting mixture for a certain period of time. The mixing process may be performed by rotation or stirring, particularly at a temperature of 45° C. to 80° C. The aging process may be performed for 3 minutes to 60 minutes.

The catalyst precursor may be further subjected to drying after being supported on the support.

The drying process may be performed at a temperature of 60° C. to 200° C. for 4 hours to 16 hours.

The second heat treatment process may be performed in an air atmosphere for 1 hour to 6 hours. The second heat treatment process may be performed at a temperature of preferably 700° C. to 800° C. When the second heat treatment temperature is within the above-described range, a supported catalyst, in which the catalyst precursor is present in a state of being coated on a surface and fine pores of the support, is prepared. In addition, entangled-type carbon nanotubes, which are a final product manufactured using the supported catalyst, have a bulk density within the above-described range and satisfy the condition of Equation 1.

5) Reaction Between Supported Catalyst and Carbon-Based Compound

Subsequently, the supported catalyst is reacted with a carbon-based compound.

The reaction between the supported catalyst and a carbon-based compound may be carried out by a chemical vapor synthesis method.

Specifically, the reaction may be performed by feeding the supported catalyst into a horizontal fixed bed reactor or a fluidized bed reactor, and injecting the carbon-based compound in a gaseous state (hereinafter, referred to as "gas-phase"), or the gas-phase carbon-based compound and a mixed gas of a reducing gas (e.g., hydrogen, or the like) and a carrier gas (e.g., nitrogen, or the like) into the reactor at a temperature of a thermal decomposition temperature or more of the carbon-based compound and a melting point or less of a catalyst of the supported catalyst, thereby growing carbon nanotubes using a chemical vapor synthesis method through decomposition of the gas-phase carbon-based compound. Carbon nanotubes manufactured by the chemical vapor synthesis method have a crystal growth direction almost parallel to a tube axis and have high crystallinity of a graphite structure in a tube longitudinal direction. As a result, carbon nanotube units have a small diameter, high electrical conductivity, and high strength.

In addition, the entangled-type carbon nanotubes may be manufactured at a temperature of particularly 500° C. to 800° C., more particularly 550° C. to 750° C. With the above-described reaction temperature range, the weight of the entangled-type carbon nanotubes may be reduced while the generation of non-crystalline carbon is minimized and a bulk size of produced carbon nanotubes is maintained, and thus dispersibility according to a decrease in bulk density may be further enhanced. As a heat source for the heat treatment processes, induction heating, radiation heat, a laser, IR, microwaves, plasma, surface plasmon heating, or the like may be used.

In addition, carbon may be supplied as the carbon-based compound, and the carbon-based compound is not particularly limited as long as it can be present in a gaseous state at a temperature of 300° C. or more.

The carbon-based compound may be a carbon-based compound having 6 carbon atoms, and more particularly may be one or more selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

In the manufacturing method of the present invention, a removal process for removing metal catalyst-derived metal impurities remaining in the entangled-type carbon nanotubes may be optionally performed. In this regard, the metal impurities removal process may be performed according to a general method such as washing, acid treatment, or the like.

EXAMPLES

Hereinafter, embodiments of the present invention will be described in detail in such a way that the invention may be carried out without undue difficulty by one of ordinary skill in the art to which the present invention pertains. However, the present invention may be embodied in many different forms and the following examples are not intended to limit the scope of the present invention.

<Preparation of Entangled-Type Carbon Nanotubes>

Example 1

Aluminum hydroxide $(Al(OH)_3)$ as an aluminum-based support precursor was subjected to first heat treatment in an air atmosphere at 450° C. for 4 hours, thereby preparing an aluminum-based support including 40 wt % or more of AlO(OH).

Separately, citric acid and $NH_4VO_3$ were added into water in a molar ratio of 1:0.0475 to prepare an aqueous $NH_4VO_3$ solution. Co(NO$_3$)$_2$.6H$_2$O and the aqueous NH$_4$VO$_3$ solution were mixed such that a molar ratio of Co to V was 10:1, thereby preparing an aqueous catalyst precursor solution, which is a clear aqueous solution.

The support and the aqueous catalyst precursor solution were mixed such that the respective amounts of Co and V in the aqueous catalyst precursor solution were 23 moles and 2.3 moles with respect to 100 moles of Al in the support.

The aqueous catalyst precursor solution was supported on the support in a 60° C. thermostatic bath for 5 minutes, and then dried in an air atmosphere at 120° C. for 12 hours. Subsequently, the resulting support was subjected to second heat treatment in an air atmosphere at 720° C. for 4 hours, thereby preparing a supported catalyst.

0.1 g of the supported catalyst was placed in the center of a quartz tube having an inner diameter of 55 mm located in a fixed bed reactor. The inside of the fixed bed reactor was heated to 650° C. in a nitrogen atmosphere and maintained, followed by synthesis for 60 minutes while flowing a mixture of nitrogen, ethylene gas, and hydrogen gas in a volume ratio of 1:1:1 at a rate of 0.3 f/min, thereby obtaining entangled-type carbon nanotubes.

Example 2

Entangled-type carbon nanotubes were prepared in the same manner as in Example 1, except that citric acid and NH$_4$VO$_3$ were added to water in a molar ratio of 1:0.05 and dissolved to prepare an aqueous NH$_4$VO$_3$ solution.

Example 3

Entangled-type carbon nanotubes were prepared in the same manner as in Example 1, except that citric acid and NH$_4$VO$_3$ were added to water in a molar ratio of 1:0.072 and dissolved to prepare an aqueous NH$_4$VO$_3$ solution.

Example 4

Entangled-type carbon nanotubes were prepared in the same manner as in Example 1, except that citric acid and NH$_4$VO$_3$ were added to water in a molar ratio of 1:0.082 and dissolved to prepare an aqueous NH$_4$VO$_3$ solution.

Example 5

Entangled-type carbon nanotubes were prepared in the same manner as in Example 1, except that citric acid and NH$_4$VO$_3$ were added to water in a molar ratio of 1:0.085 and dissolved to prepare an aqueous NH$_4$VO$_3$ solution.

Comparative Example 1

Entangled-type carbon nanotubes were prepared in the same manner as in Example 1, except that citric acid and NH$_4$VO$_3$ were added to water in a molar ratio of 1:0.045 and dissolved to prepare an aqueous NH$_4$VO$_3$ solution.

Comparative Example 2

Entangled-type carbon nanotubes were prepared in the same manner as in Example 1, except that citric acid and NH$_4$VO$_3$ were added to water in a molar ratio of 1:0.09 and dissolved to prepare an aqueous NH$_4$VO$_3$ solution.

Comparative Example 3

Carbon nanotubes were prepared in the same manner as in Example 1, except that citric acid and NH$_4$VO$_3$ were added to water in a molar ratio of 1:5.8 and dissolved to prepare an aqueous NH$_4$VO$_3$ solution, but the manufactured carbon nanotubes were a bundle type.

Comparative Example 4

Entangled-type carbon nanotubes (manufacturer: Bayer, Product Name: C150P) were used.

Comparative Example 5

Entangled-type carbon nanotubes (manufacturer: LG Chem, Ltd.) were used.

Experimental Example 1

Figure 1:
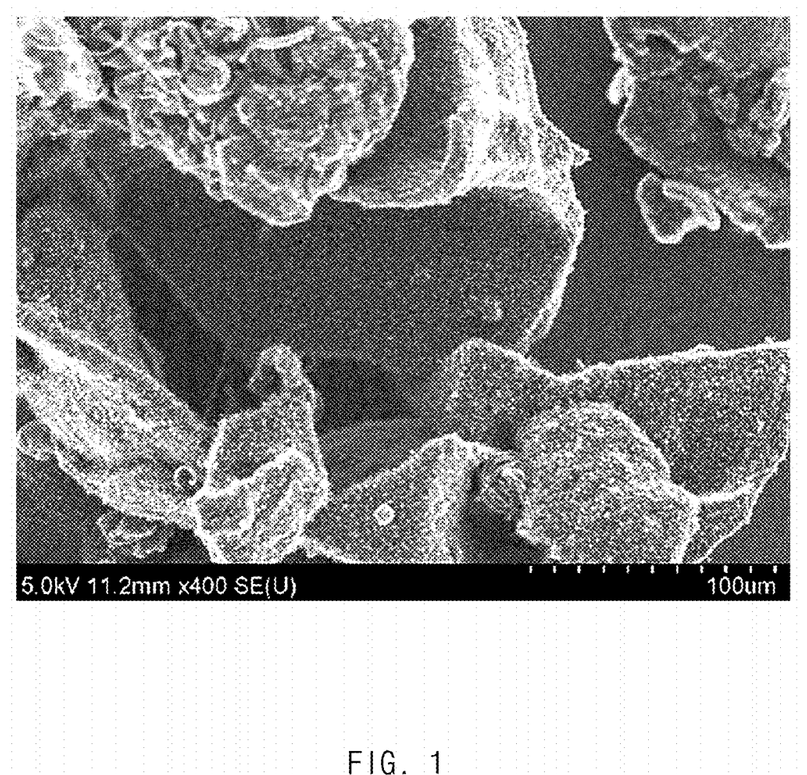
FIG. 1 is a scanning electron microscope image showing surfaces of entangled-type carbon nanotubes of Example 3 at a magnification of 400×.
Figure 2:
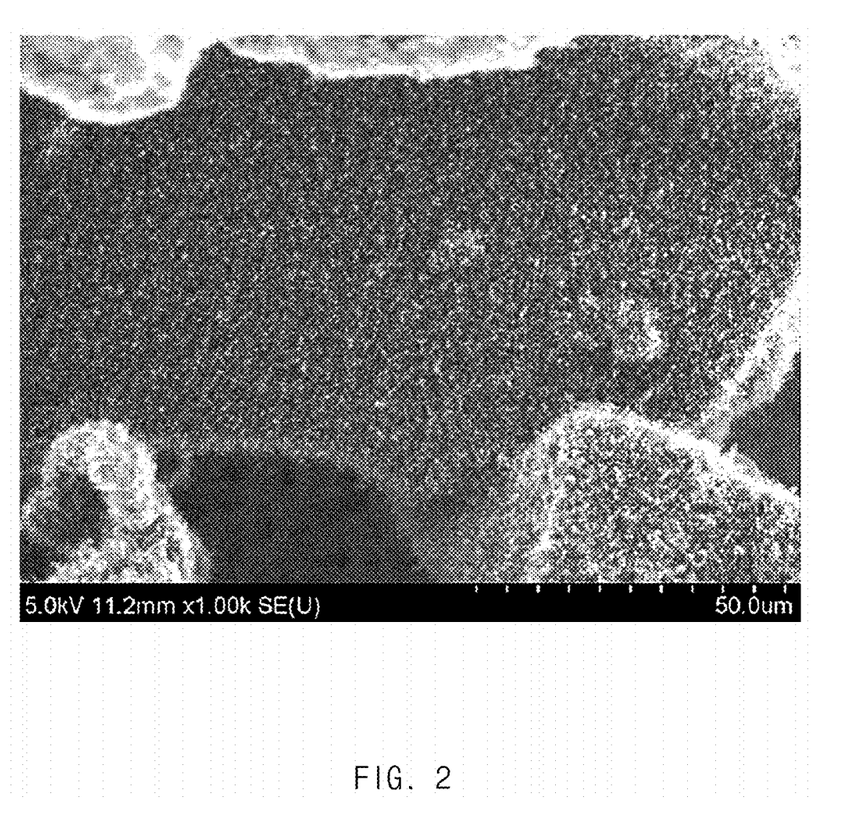
FIG. 2 is a scanning electron microscope image showing surfaces of the entangled-type carbon nanotubes of Example 3 at a magnification of 1,000×.
Figure 3:
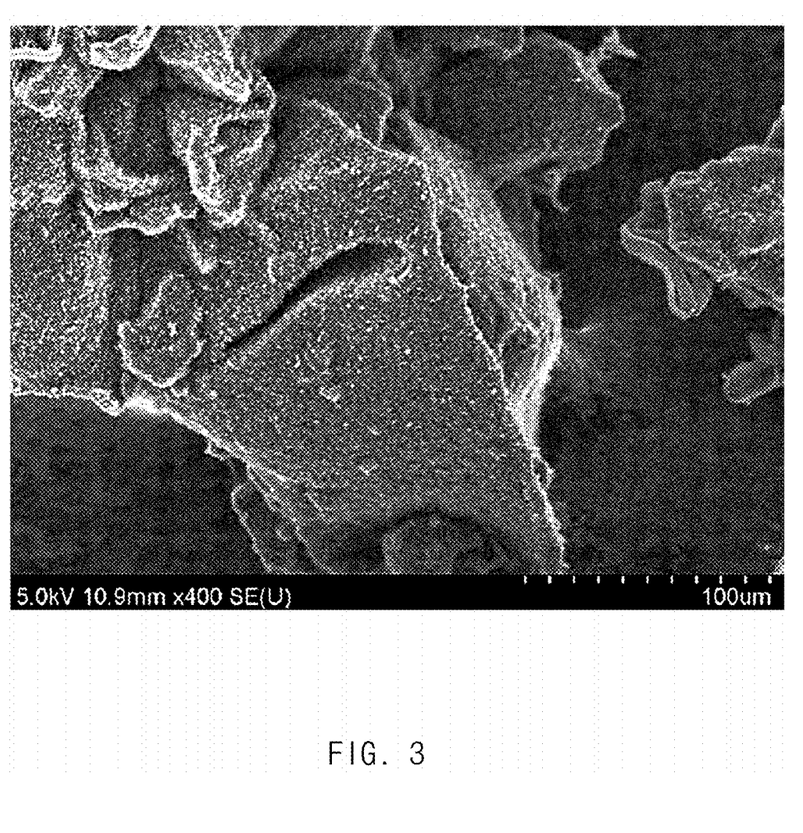
FIG. 3 is a scanning electron microscope image showing surfaces of entangled-type carbon nanotubes of Example 4 at a magnification of 400×.
Figure 4:
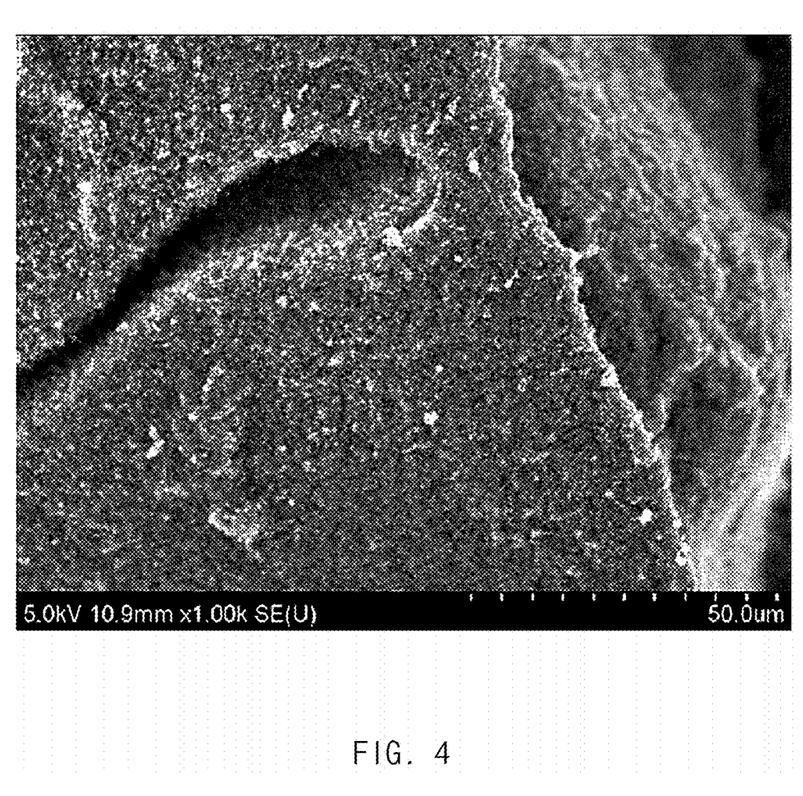
FIG. 4 is a scanning electron microscope image showing surfaces of the entangled-type carbon nanotubes of Example 4 at a magnification of 1,000×.

The entangled-type carbon nanotubes prepared according to Examples 3 and 4 were photographed using a scanning electrode microscope (SEM), and the results of Example 3 are shown in FIGS. 1 and 2, and the results of Example 4 are shown in FIGS. 3 and 4.

In this regard, FIGS. 1 and 3 are enlarged SEM images of surfaces of the entangled-type carbon nanotubes at a magnification of 400×. FIGS. 2 and 4 are enlarged SEM images of surfaces of the entangled-type carbon nanotubes at a magnification of 1,000×.

Referring to FIGS. 1 to 4, it was confirmed that the carbon nanotubes of Examples 3 and 4 were an entangled-type.

Experimental Example 2

Physical properties of the carbon nanotubes of the examples and the comparative examples were measured using the following methods, and the results thereof are shown in Tables 1 and 2 below.

(1) Production yield: {(total weight of prepared carbon nanotubes)−(total weight of supported catalyst used)}/(total weight of supported catalyst used)

(2) Bulk density: A 5 ml cylinder (manufacturer: DURAN, material: glass), a weight of which was known, was filled with carbon nanotubes, the cylinder was weighed, and then the bulk density was calculated according to the following Equation.

Bulk density (kg/m$^3$)=weight (kg) of carbon nanotubes/volume (m$^3$) of carbon nanotubes (3) Tapped bulk density: The tapped bulk density was measured using TAP-2S manufactured by LOGAN in accordance with ASTM B527-06.

(4) Specific surface area (m$^2$/g): Specific surface area may be calculated from the amount of nitrogen gas adsorbed at a liquid nitrogen temperature (77 K), using BELSORP-mini II manufactured by BEL Japan.

(5) Secondary structural form: It was confirmed through an SEM.

(6) Powder resistance (ohm. cm A 1 g/cc): An insulating mold was filled with carbon nanotubes so as to have a density of 1 g/cc, a pressure was applied thereto, surface current and voltage were measured using 4 probes through Loresta-GX(Product Name, manufacturer: MITSUBISHI CHEMICAL ANALYTECH), and a powder resistance was calculated therefrom.

(7) Maximum dispersion concentration (wt %): A carbon nanotube dispersion was prepared by adding carbon nanotubes to N-methylpyrrolidone little by little. Then, a maximum dispersion concentration of the carbon nanotubes dispersible in the carbon nanotube dispersion was measured.

TABLE 1

| Classification | Example 1 | Example 2 | Example 3 | Example 4 | Example 5 |
|---|---|---|---|---|---|
| Molar ratio of citric acid to $NH_4VO_3$ | 1:0.0475 | 1:0.05 | 1:0.072 | 1:0.082 | 1:0.085 |
| Secondary structural form | Entangled-type | Entangled-type | Entangled-type | Entangled-type | Entangled-type |
| Production yield | 11 | 11 | 18.5 | 21.8 | 22.7 |
| Bulk density (kg/m$^3$) | 32 | 36 | 61 | 76 | 80 |
| Tapped bulk density (kg/m$^3$) | 64 | 65 | 93 | 111 | 112 |
| Tapped bulk density/bulk density | 2.0 | 1.8 | 1.52 | 1.46 | 1.41 |
| Powder resistance (ohm · cm @ 1 g/cc) | 0.0162 | 0.0161 | 0.0166 | 0.0170 | 0.0171 |
| Maximum dispersion concentration (wt %) | 3.5 | 3.5 | 3.5 | 3.5 | 3.5 |

TABLE 2

| Classification | Comparative Example 1 | Comparative Example 2 | Comparative Example 3 | Comparative Example 4 | Comparative Example 5 |
|---|---|---|---|---|---|
| Molar ratio of citric acid to $NH_4VO_3$ | 1:0.045 | 1:0.09 | 1:5.8 | — | — |
| Secondary structural form | Entangled-type | Entangled-type | Bundle type | Entangled-type | Entangled-type |
| Production yield | 10 | 24 | 19.2 | 20 | 44 |
| Bulk density (kg/m$^3$) | 29 | 90 | 45 | 150 | 172 |
| Tapped bulk density (kg/m$^3$) | 61 | 120 | 75 | 172 | 208 |
| Tapped bulk density/bulk density | 2.1 | 1.33 | 1.66 | 1.17 | 1.21 |
| Powder resistance (ohm · cm @ 1 g/cc) | 0.0171 | 0.0181 | 0.0088 | 0.0180 | 0.0179 |
| Maximum dispersion concentration (wt %) | 2.0 | 3.0 | 1.25 | 3.5 | 3.5 |

Referring to Tables 1 and 2, the entangled-type carbon nanotubes of Examples 1 to 5 prepared by adding citric acid and $NH_4VO_3$ in a molar ratio of 1:0.0475 to 1:0.085 had a bulk density of 32 kg/m$^3$ to 80 kg/m$^3$ and satisfied the condition of Equation 1. In addition, the entangled-type carbon nanotubes of Examples 1 to 5 exhibited a low powder resistance and a high maximum dispersion concentration, and thus it was anticipated that the entangled-type carbon nanotubes were suitable for use in a conductive material dispersion due to excellent conductivity and inclusion in a dispersion at a high concentration.

Meanwhile, it was confirmed that the entangled-type carbon nanotubes of Comparative Example 1 manufactured by adding citric acid and $NH_4VO_3$ in a molar ratio of 1:0.045 had a lower bulk density than that of the case of the present invention and were unable to satisfy the condition of Equation 1. In addition, although the entangled-type carbon nanotubes of Comparative Example 1 had a low powder resistance, they could not be included in a dispersion at a high concentration, from which it was anticipated that the entangled-type carbon nanotubes were not suitable for use in a conductive material dispersion.

In addition, it was confirmed that the entangled-type carbon nanotubes of Comparative Example 2 manufactured by adding citric acid and $NH_4VO_3$ in a molar ratio of 1:0.09 had a higher bulk density than that of the case of the present invention and were unable to satisfy the condition of Equation 1. The entangled-type carbon nanotubes of Comparative Example 2 had a high powder resistance and could not be included in a dispersion at a high concentration, and thus were anticipated to be not suitable for use in a conductive material dispersion.

In addition, it was confirmed that the carbon nanotubes of Comparative Example 3 manufactured by adding citric acid and $NH_4VO_3$ in a molar ratio of 1:5.8 were a bundle type and did not satisfy the condition of Equation 1. In addition, although the bundle-type carbon nanotubes of Comparative Example 3 had a low powder resistance, they could not be included in a dispersion at a high concentration, and thus it was anticipated that they were not suitable for use in a conductive material dispersion.

It was also confirmed that the entangled-type carbon nanotubes of Comparative Examples 4 and 5, which are commercially available carbon nanotubes, had an excessively high bulk density and were also unable to satisfy the condition of Equation 1. In addition, the entangled-type carbon nanotubes of Comparative Examples 4 and 5 were anticipated to be not suitable for use in a conductive material dispersion due to their high powder resistances.

The invention claimed is:

1. Entangled-type carbon nanotubes in which carbon nanotube units are entangled but without a uniform bundle or a rope shape, which have a bulk density of 31 kg/m$^3$ to 85 kg/m$^3$ and satisfies the following Equation 1:

$$1.37 \leq X/Y \leq 2.05 \qquad \text{<Equation 1>}$$

wherein, in Equation 1, X denotes a tap density (units: kg/m$^3$) of the entangled-type carbon nanotubes, and Y denotes a bulk density (units: kg/m$^3$) of the entangled-type carbon nanotubes.

2. The entangled-type carbon nanotubes of claim 1, wherein carbon nanotubes satisfy the following Equation 1:

$$1.4 \leq X/Y \leq 2.0. \qquad \text{<Equation 1>}$$

3. The entangled-type carbon nanotubes of claim 1, wherein the bulk density of the entangled-type carbon nanotubes is 32 kg/m$^3$ to 80 kg/m$^3$.

4. The entangled-type carbon nanotubes of claim 1, wherein the tapped bulk density of the entangled-type carbon nanotubes is 63 kg/m$^3$ to 116 kg/m$^3$.

5. The entangled-type carbon nanotubes of claim 1, wherein the entangled-type carbon nanotubes have a maximum dispersion concentration of 3.3 wt % or more.

6. Entangled-type carbon nanotubes which have a bulk density of 31 kg/m$^3$ to 85 kg/m$^3$ and satisfies the following Equation 1:

$$1.37 \leq X/Y \leq 2.05 \qquad \text{<Equation 1>}$$

wherein, in Equation 1, X denotes a tap density (units: kg/m$^3$) of the entangled-type carbon nanotubes, and Y denotes a bulk density (units: kg/m$^3$) of the entangled-type carbon nanotubes, wherein the entangled-type carbon nanotubes comprise carbon nanotube units having an average diameter of 10 nm to 30 nm, wherein the carbon nanotube units have an interlayer distance ($d_{002}$) of a carbon crystal of 0.335 nm to 0.342 nm, wherein the interlayer distance is obtained by X-ray diffraction, satisfy the following condition: interlayer distance ($d_{002}$) <0.3448−0.0028 (log φ) wherein φ is an average diameter of the carbon nanotube units, and have a thickness (Lc) in a C-axis direction of the crystal of 40 nm or less.

7. Entangled-type carbon nanotubes which have a bulk density of 31 kg/m$^3$ to 85 kg/m$^3$ and satisfies the following Equation 1:

$$1.37 \leq X/Y \leq 2.05 \qquad \text{<Equation 1>}$$

wherein, in Equation 1, X denotes a tap density (units: kg/m$^3$) of the entangled-type carbon nanotubes, and Y denotes a bulk density (units: kg/m$^3$) of the entangled-type carbon nanotubes, wherein the entangled-type carbon nanotubes have a powder resistance of 0.0171 Ω·cm or less.

* * * * *